United States Patent
Young et al.

(10) Patent No.: US 8,981,751 B1
(45) Date of Patent: Mar. 17, 2015

(54) CONTROL SYSTEM OPTIMIZATION VIA ADAPTIVE FREQUENCY ADJUSTMENT

(75) Inventors: Chris M. Young, Austin, TX (US); Douglas E. Heineman, Lakeway, TX (US); Gregory T. Chandler, Austin, TX (US)

(73) Assignee: Intersil Americas LLC, Milpitas, CA (US)

( * ) Notice: Subject to any disclaimer, the term of this patent is extended or adjusted under 35 U.S.C. 154(b) by 1595 days.

(21) Appl. No.: 12/118,260

(22) Filed: May 9, 2008

Related U.S. Application Data (60) Provisional application No. 60/917,059, filed on May 9, 2007.

(51) Int. Cl.
    *G05F 1/00* (2006.01)

(52) U.S. Cl.
    USPC .......................................... 323/283; 323/282

(58) Field of Classification Search
    USPC ........................ 363/21.04, 21.05, 21.09, 21.1, 363/21.11–21.14, 73–80, 109, 159, 163, 363/164, 165; 323/282–286, 234, 241, 246, 323/259, 265, 266, 271, 280, 311
    See application file for complete search history.

(56) References Cited

U.S. PATENT DOCUMENTS

| | | | |
|---|---|---|---|
| 5,568,044 A * | 10/1996 | Bittner | 323/272 |
| 5,710,822 A | 1/1998 | Steenhagen et al. | |
| 5,841,652 A | 11/1998 | Sanchez | |
| 6,678,668 B2 | 1/2004 | Fisher et al. | |
| 7,002,997 B2 * | 2/2006 | Lin et al. | 370/516 |
| 7,015,739 B2 * | 3/2006 | Lee et al. | 327/175 |
| 7,345,863 B2 * | 3/2008 | Fischer | 361/80 |
| 7,376,472 B2 | 5/2008 | Wojsznis et al. | |
| 7,489,090 B2 * | 2/2009 | Taipale | 315/307 |
| 7,495,565 B2 * | 2/2009 | Oakes et al. | 340/572.6 |
| 7,555,092 B2 | 6/2009 | Russell et al. | |
| 2003/0086520 A1 | 5/2003 | Russell et al. | |
| 2004/0000143 A1 * | 1/2004 | Ahmad | 60/600 |
| 2004/0101083 A1 | 5/2004 | Russell et al. | |
| 2004/0117766 A1 | 6/2004 | Mehta et al. | |
| 2006/0119336 A1 * | 6/2006 | King | 323/282 |
| 2006/0152204 A1 * | 7/2006 | Maksimovic et al. | 323/284 |
| 2006/0203814 A1 | 9/2006 | Ye et al. | |
| 2007/0080671 A1 * | 4/2007 | Qahouq et al. | 323/282 |
| 2007/0116132 A1 | 5/2007 | Fediakine et al. | |
| 2009/0222136 A1 | 9/2009 | Lou | |

\* cited by examiner

*Primary Examiner* — Adolf Berhane
*Assistant Examiner* — Henry Lee, III
(74) *Attorney, Agent, or Firm* — Meyertons Hood Kivlin Kowert & Goetzel, P.C.; Jeffrey C. Hood (57) ABSTRACT

A feedback control system, e.g. a voltage regulator, may include a control stage controlling an output stage that generates an output. The control stage may generate a control signal, e.g. a pulse-width modulated signal, having a duty-cycle and a switching frequency, and adjust the switching frequency when a present value of the duty-cycle differs from a most recent previous value of the duty-cycle, until the duty-cycle starts increasing, while also adjusting the duty-cycle according to the output. By adjusting the switching frequency, the (power) efficiency of the system may be optimized also regulating the output. The feedback system may also adjust the switching frequency according to an alternate algorithm to improve but not necessarily optimize the power efficiency by scaling a programmed frequency value using a scaling factor that is a function of a maximum duty-cycle value, a present frequency value, the programmed frequency value, and a minimum frequency value.

24 Claims, 6 Drawing Sheets

CONTROL SYSTEM OPTIMIZATION VIA ADAPTIVE FREQUENCY ADJUSTMENT

PRIORITY CLAIM

This application claims benefit of priority of U.S. provisional application Ser. No. 60/917,059 titled "High Performance Power Conversion and Digital Power Control", filed May 9, 2007, which is hereby incorporated by reference in its entirety as though fully and completely set forth herein.

BACKGROUND OF THE INVENTION

1. Field of the Invention

This invention relates to feedback systems and, more particularly, to optimizing operation of the feedback system, such as a voltage regulator, with respect to one or more operating characteristics, such as power efficiency, by adaptively adjusting the switching frequency.

2. Description of the Related Art

The rapid evolution and increased power consumption of commercial integrated circuits, such as microprocessors and graphics processors, has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL). However, it may not be practical to route high-current signals throughout a system. To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA.

In many power distribution systems it is typically not enough to just distribute power around a system to the various POLs. Complex electronic systems are generally monitored and controlled to ensure maximum reliability and performance. Functions (power supply features) typically implemented in DPA systems include supply sequencing, hot swap ability, ramp control, voltage programming, load monitoring, tracking, temperature monitoring, fan speed control, phase control, current sharing, switching frequency programmability, and switching clock synchronization, to name a few. There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement glue-logic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system. In an effort to tie all or most of these functions together at the system level, one approach has been to implement the functions in control ICs responsible for controlling respective POL converters. Some of the functionality may also be programmed into a microcontroller that may communicate with attached POL converters over an I2C (inter-IC communication) bus to coordinate control of all POL converters in the system.

Figure 1:
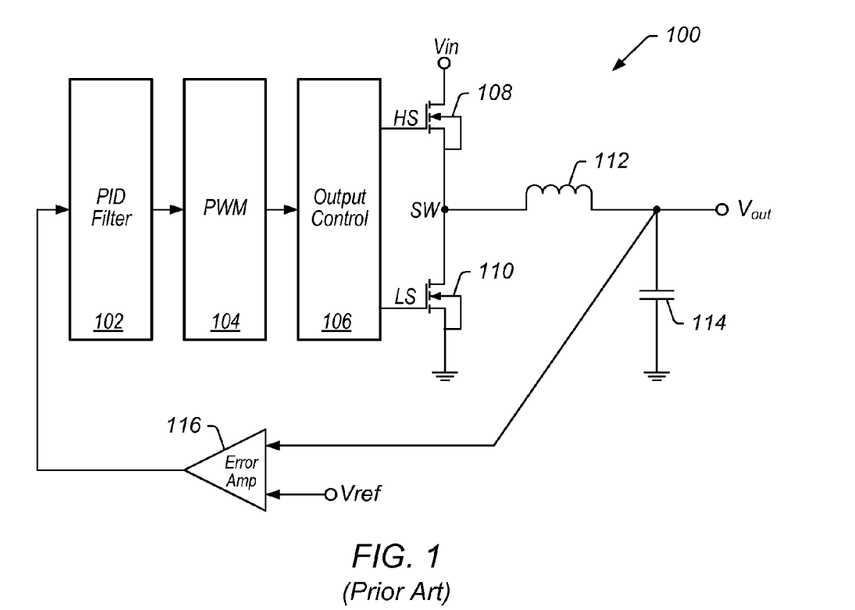
FIG. 1 shows one embodiment of a power regulator (Buck Regulator), according to prior art.

DC-to-DC conversion is often performed by switching power regulators, or step-down regulators, converting a higher voltage (e.g. 12V) to a lower value as required by one or more load devices. A common architecture features distribution of the higher voltage to multiple power regulators, each producing a different (or possibly the same) voltage to one or more loads. Switching power regulators often use two or more power transistors to convert energy at one voltage to another voltage. One common example of such a power regulator 100, commonly called a "Buck Regulator" is shown in FIG. 1. Buck Regulator 100 typically switches a pair of power transistors (108 and 110) in order to produce a square-wave at their common node SW. The produced square-wave can be smoothed out using an LC circuit comprising inductor 112 and capacitor 114 to produce the desired voltage, $V_{out}$. A control loop, comprised of an Error Amplifier 116, a Proportional-Integral-Differential (PID) Filter 102, a Pulse-Width-Modulator (PWM) 104, and an Output Control circuit 106, can be configured to control the duty-cycle of the output square-wave, and hence the resulting value of $V_{out}$.

However, in a feedback control system such as the control loop configured in the Buck Regulator shown in FIG. 1, the actual duty cycle value—for the output square-wave signals of Output Control circuit 106—required to maintain regulation of $V_{out}$ may deviate from a nominal (ideal) duty cycle value that would be required to maintain regulation of $V_{out}$ in an ideal, lossless system. In other words, as a result of the feedback system experiencing energy loss(es), manifested for example as excess heat, the actual duty cycle value required to maintain regulation of $V_{out}$ will deviate from an ideal duty cycle value (required to maintain regulation of $V_{out}$), in proportion to the incurred loss(es). In general, various parameters (that may not directly affect regulation of a system output like $V_{out}$) may lead to conduction losses in the system. One of these parameters may be the switching frequency of the regulator, that is, the frequency of the output square-wave signals, that is, the PWM signals controlling LS FET 110 and HS FET 108 configured in Buck Regulator 100. It may therefore be desirable to adjust the switching frequency in a manner that optimizes system efficiency, without adversely affecting the regulation of the output voltage $V_{out}$ of Buck Regulator 100.

Many other problems and disadvantages of the prior art will become apparent to one skilled in the art after comparing such prior art with the present invention as described herein.

SUMMARY OF THE INVENTION

The power efficiency of a (feedback) control system may be improved and/or optimized by adjusting the frequency of the primary control signal or control signals configured to regulate the system output, without adversely affecting regulation of the system output. In one set of embodiments, the system efficiency may be optimized by adjusting a present value of a first parameter, e.g. the frequency, of a control signal used for regulating the output of the system, observing the resulting present value of a second parameter, e.g. duty-cycle, of the control signal, comparing the present value of the second parameter to a most recent previous value of the second parameter, and adjusting the present value of the first parameter in response to the present value of the second parameter differing from the most recent previous value of the second parameter. The adjustment of the first parameter may be performed until the present value of the second parameter is within a specific range of values. The present value of the second parameter may be adjusted based on the output of the system, to effect the control signal performing feedback control of the system output.

In one set of embodiments, the present value of a switching frequency of a first control signal configured to regulate the output of the system, e.g. a pulse-width modulated (PWM) signal, may be adjusted, and a resulting present value of a duty-cycle of the first control signal may be compared to a most recent previous value of the duty-cycle. In response to the comparison indicating that the present value of the duty-cycle is less than the most recent previous value of the duty-cycle, the present value of the switching frequency may be adjusted, until the present value of the duty-cycle is greater than the most recent previous value of the duty-cycle. The present value of the duty-cycle of the first control signal may be adjusted according to the system output to perform feedback control of the system.

In one set of embodiments, when more than on control signal may be used in performing feedback control, the present value of a switching frequency of at least a second control signal may be adjusted in response to the comparison indicating that the present value of the duty-cycle of the first control signal is less than the most recent previous value of the duty-cycle of the first control signal, until the present value of the duty-cycle of the first control signal is greater than the most recent previous value of the duty-cycle of the first control signal. In these embodiments, the output of the system may be regulated using the second control signal in addition to using the first control signal. In a system that operates at optimum efficiency when the duty-cycle of the control signal is at a possible minimum value required to maintain regulation of the system output, the present value of the frequency of the control signal may be adjusted to maintain the present value of the switching frequency of the control signal at a value that corresponds to the minimum value of the duty-cycle of the control signal at which regulation of the output of the system may be maintained.

In an alternate set of embodiments, the output of a voltage regulator may be regulated while improving efficiency of the voltage regulator, by obtaining a present value of a first parameter, e.g. the duty-cycle, of a first control signal used to control the output of the voltage regulator, e.g. a PWM signal, and adjusting, according to the present value of the first parameter, a present value of a second parameter, e.g. switching frequency, of the first control signal and/or one or more additional control signals. The present value of the second parameter may be adjusted according to different rules, based on what the obtained present value of the first parameter is. In one embodiment, the present value of the second parameter may be set to a corresponding fixed value when the present value of the first parameter reaches one of two boundary values, with a first one of the two boundary values greater than the second one of the two boundary values. When the present value of the first parameter is between the two boundary values, the present value of the second parameter may be adjusted according to a scaling factor that may be a function of the first parameter. For example, the present value of the second parameter may be set to a minimum value when the present value of the first parameter reaches the lower one of the two boundary values, and it may be set to the programmed value when the present value of the first parameter reaches the higher of the two boundary values. In one embodiment, the scaling factor may be a function of a maximum (highest) value of the first parameter, the present value of the first parameter, the programmed value of the second parameter, and a minimum (lowest) value of the second parameter. The minimum value of the second parameter may also be determined based on what the programmed value of the second parameter is.

A voltage regulator may therefore be designed with an output stage configured to generate an output voltage, and a control stage coupled to the output stage to control the output stage and thereby regulate the output voltage. The control stage may be configured to generate a PWM control signal having a duty-cycle and a switching frequency, to regulate the output voltage, adjust the switching frequency when a present value of the duty-cycle differs from a most recent previous value of the duty-cycle, until the present value of the duty-cycle is greater than the most recent previous value of the duty-cycle, and adjust the present value of the duty-cycle according to the output voltage. By thereby adjusting the switching frequency, the (power) efficiency of the system may be optimized while maintaining regulation of the output voltage according to the feedback control loop. The voltage regulator may also be designed to adjust the switching frequency according to the alternate algorithm described above, to simply improve but not necessarily optimize the power efficiency of the voltage regulator.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

Incorporation by Reference

U.S. Publication No. 20040201279 titled "Method and apparatus for improved DC power delivery management and configuration" and filed on Apr. 8, 2004, whose inventor is James W. Templeton, is hereby incorporated by reference in its entirety as though fully and completely set forth herein.

U.S. patent application Ser. No. 11/198,698 titled "Method For Using A Multi-Master Multi-Slave Bus For Power Management" and filed on Aug. 5, 2005, whose inventors are Kenneth W. Fernald, James W. Templeton and John A. Wishneusky, is hereby incorporated by reference in its entirety as though fully and completely set forth herein.

U.S. Patent Application No. 60/917,059 titled "High Performance Power Conversion and Digital Power Control" and filed on May 9, 2008, whose inventor is Chris M. Young, and which is hereby incorporated by reference in its entirety as though fully and completely set forth herein.

As previously mentioned, one example of a feedback system may be directed to DC-to-DC conversion, which may be performed by a switching power regulator using two or more power transistors, which may operate to convert energy at one voltage to another voltage. In general, as used herein, the terms "voltage regulator" and "point-of-load (POL) regulator" are used interchangeably to refer to a device configured to perform voltage conversion, and which may include not only feedback control circuitry, but also additional control circuitry configured to perform one or more functions related to power regulation and control, in addition to performing voltage conversion. A POL regulator may also be divided into the voltage converter section, which essentially comprises an output stage of the POL regulator, and control circuitry, which may comprise all other functionality of the POL regulator, including the regulating and control functions. In one set of embodiments, the control circuitry may be implemented on an integrated circuit, and coupled to an external output stage to construct a complete POL regulator. One power regulator, a Buck Regulator, was shown in FIG. 1. In general, transistors 108 and 110 may be controlled such that they do not conduct current at the same time. Typically, when transistor 108 is turned on (HS is asserted), transistor 110 may be turned off (LS is de-asserted). However, depending on the details of the power stage and its load, the efficiency of the regulator may be improved by careful control of the relationship between the two gate control signals, HS and LS.

Figure 2:
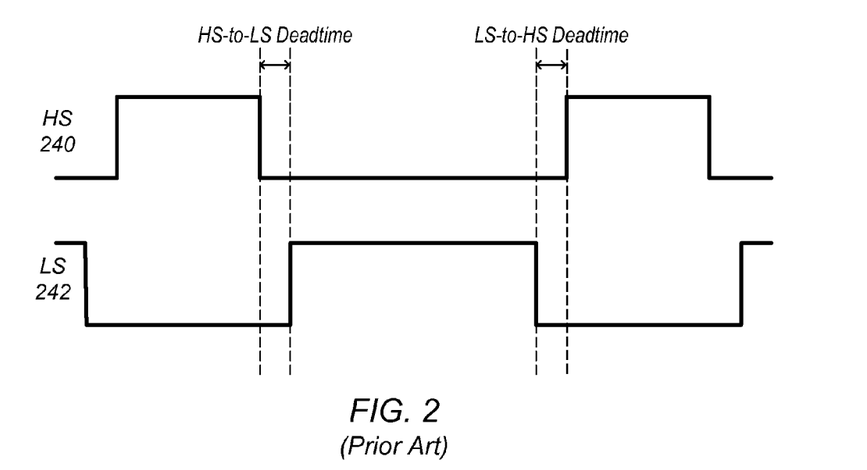
FIG. 2 shows one possible timing diagram for the high side FET and low side FET pulse width modulated (PWM) control signals for the Buck Regulator of FIG. 1 according to prior art.

FIG. 2 illustrates a simple timing diagram for a Buck Regulator, such as the regulator shown in FIG. 1. As shown in FIG. 2, a brief "deadtime" may be generated between transistor 408 being disabled—shown as HS signal 240 de-asserting from a high value to a low value—and transistor 110 being enabled—shown as LS signal 242 asserting from a low value to a high value. The period during which both devices are turned off generally eliminates the possibility of their conducting current directly from the input to ground. If the deadtime is too short, such cross-conduction could waste power. If the deadtime is too long, the body-diode of transistor 110 may conduct current, thereby also wasting power. It is therefore desirable to optimize the timing to obtain greater efficiency, that is, the highest possible ratio of the output power to the input power ($P_{out}/P_{in}$). In general, power efficiency may be thought of as $P_{out}/P_{in}$, and higher efficiency may be regarded as a higher value of the $P_{out}/P_{in}$ ratio. While regulation of the output voltage $V_{out}$ in Regulator 100 takes places primarily by adjusting the duty-cycle of the square waves (shown in FIG. 2, for example) based on $V_{out}$ according to the feedback loop, a waste, or power loss (inefficiency of the system) will also have an effect on the value of the duty-cycle.

Consequently, because the deadtime between signals HS 240 and LS 242 affects power efficiency, the deadtime will have an indirect effect on the value of the duty-cycle. In one sense, deadtime may be considered an independent parameter that may lead to power loss (as explained above). In this context, deadtime may be considered an independent parameter since it is not a parameter that is configured to directly regulate the value of the output voltage $V_{out}$. In one set of embodiments, it can be demonstrated that power loss (waste of power; inefficiency) actually leads to an increase in the value of the duty-cycle at which regulation of $V_{out}$ may be maintained. As a result of the above-mentioned relationship between deadtime and the duty-cycle value, an optimal value of the deadtime may be determined by monitoring the duty-cycle and adjusting the deadtime until the duty-cycle reaches a minimum value at which regulation of $V_{out}$ can be maintained. The deadtime value thus obtained may correspond to an optimum deadtime value at which the system operates with maximum efficiency. In other words, the deadtime value thus obtained represents minimized loss with respect to the deadtime parameter, and thus represents maximized efficiency with respect to the deadtime parameter.

In general, in certain control systems, the actual value of a control parameter corresponding to a main control signal configured to maintain regulation of the output of the system may deviate from what the value of the control parameter would be in an ideal, lossless system. More broadly, the control parameter may deviate from what the value of the control parameter would be if an operating characteristic of the feedback system did not deviate from an expected, nominal target value or level. Accordingly, a relationship between various operating characteristics of the system and the control parameter, and between the operating characteristics and one or more independent parameters may be established. Again, an independent parameter may comprise a parameter that had not been designated to directly regulate an output of the system. For example, in pulse modulated control systems, the actual value of the duty-cycle required to maintain regulation of the output of the system would deviate from what the value of the duty-cycle would be in an ideal, lossless system. Typically, the actual value of the control parameter may deviate from the ideal value in proportion to the change in operating characteristic of the system, in this case in proportion to the losses. As previously mentioned, in a power regulator (voltage regulator such as Regulator 100) the operating characteristic may be loss, more specifically power loss according to $P_{out}/P_{in}$. Overall, in electrical systems, loss may represent charge loss (leading to heat), while in other systems loss might represent fluid loss, force loss, motion or mobility loss, etc.

Figure 3:
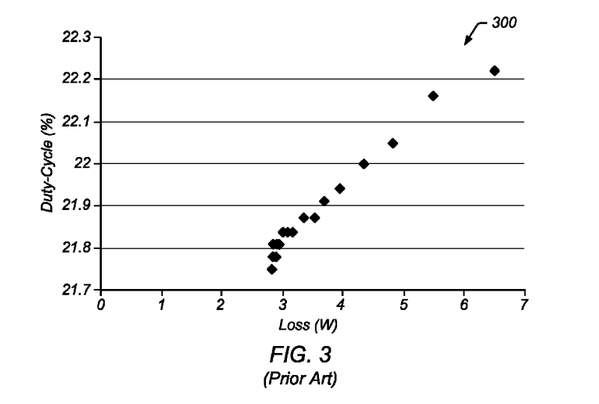
FIG. 3 shows a graph illustrating the relationship between duty-cycle value and power loss in a PWM feedback control system, according to prior art.
Figure 4:
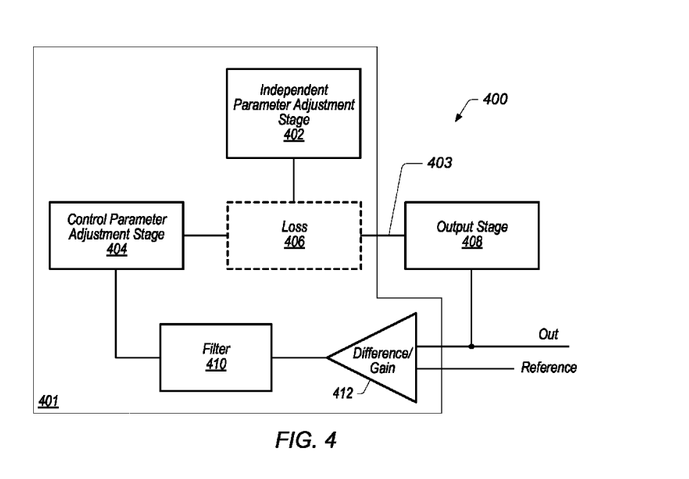
FIG. 4 shows one embodiment of a feedback control system in which an independent parameter may be adjusted to improve efficiency of the system while maintaining regulation of the system output.

FIG. 3 shows a graph 300 illustrative of a relationship of the duty-cycle value and efficiency (power) loss in a system such as Regulator 100. As graph 300 indicates, the duty-cycle value increases with increased power loss in the system. In a voltage regulator, such as Regulator 100, power loss may be effected by a variety of independent parameters, not only by the deadtime value, which was described above. In general, there may be at least one independent parameter that would lead to a loss of efficiency in an electrical system. FIG. 4 shows one embodiment of a system 400 comprising an output stage 408, which may be configured to generate an output (Out), and a control stage 401 configured in a control loop with output stage 408. Control stage 401 may include a control parameter adjustment (CPA) stage 404, which may adjust a control parameter based on the output signal Out and a Reference signal. In one set of embodiments, a Difference/Gain stage 412 may compare Out with the Reference value to generate a difference signal that is filtered through filter 410, and provided to CPA stage 404, which may adjust the control parameter according to the filtered difference signal. The output Out may thereby be regulated according to the feedback (control) loop.

As shown in FIG. 4, an independent parameter may affect an operating characteristic of system 400, for example the efficiency of system 400, which is represented in FIG. 4 by block 406 labeled "Loss". While in the embodiment shown the operating characteristic represents efficiency/power-loss, which may be manifested as charge loss leading to heat, in other systems the operating characteristic may correspond to fluid loss, force loss, motion or mobility loss, for example. As previously discussed, in an electrical system the loss may refer to power loss, as defined by $P_{out}/P_{in}$. In order to optimize for this loss with respect to the independent parameter, the independent parameter may be adjusted at the independent parameter adjustment (IPA) stage 402, the impact on the control parameter may be observed, and the independent parameter may then be adjusted until the control parameter adjusted by CPA 404 reaches a value that corresponds to the targeted level of the operating characteristic, which may mean optimized efficiency with respect to power loss. In general, the independent parameter may be adjusted until the control parameter reaches a value that is within a specific range of values of the control parameter, which may correspond to the targeted efficiency level of the operating characteristic with respect to the independent parameter.

In general, the targeted level of the operating characteristic may be related to various criteria, parameter values, or ranges of parameter values. In some cases, the exact values, for example the actual a range of parameter values, may not be known, but a criterion may well be established prior to system operation. In other words, a clear association may be established between the target level of the operating characteristic and one or more criteria. An example of a criterion may be the duty-cycle reaching a minimum, or the change of the duty-cycle indicating an increase in the duty-cycle. The optimal value or range of adequate values may not be known in advance, but the criterion may be specified. For example, one criterion may be specified as a derivative (e.g. change of duty-cycle) with respect to the independent variable changing sign (e.g. switching from a negative value to a positive value). Accordingly, a specific value or specific range of values of the control parameter are meant to encompass values of the control parameter that satisfy the specified criteria corresponding to the target level or desired target level of the operating characteristic.

Figure 4B:
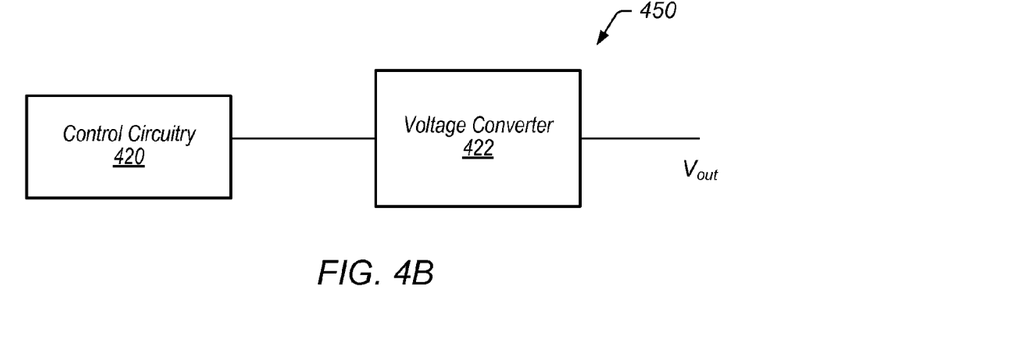
FIG. 4B shows a simplified diagram of one embodiment of a POL regulator that includes a voltage converter, and control circuitry for performing regulating and control functions of the voltage converter.

FIG. 4B shows a simplified diagram of a POL regulator 450 comprising control circuitry 420, which may be custom circuitry, a controller or processor executing code (e.g. firmware), etc., configured to perform monitoring and select control functionality, and voltage converter 422. In one set of embodiments, control circuitry 420 may be configured on an integrated circuit, and voltage converter 422 may be a voltage regulator such as Regulator 100 shown in FIG. 1. Alternately, voltage regulator 422 may simply comprise a voltage converter (output stage), such as the output stage (comprising HS FET 108, LS FET 110, inductor 112, and capacitor 114) of Regulator 100, while the remaining components of Regulator 100 may be comprised in control circuitry 420, which may also comprise additional circuitry to perform additional functionality of POL 450 regulator.

Considering Regulator 100 (or POL regulator 450) as an example of system 400, the independent parameter may be the deadtime, and the control parameter may be the duty-cycle of the control signal(s) HS 240 and LS 242. Thus, the specific range of values may be designated as a single value, in this case the minimum value of the duty-cycle at which control stage 401 is operable to maintain regulation of output Out ($V_{out}$ in Regulator 100). In some embodiments the specific range of values may be obtained through observation, in other embodiments it may be obtained through calculations. Those skilled in the art will appreciate that the specific value or specific range of values may be determined in a variety of ways other than what has specifically been mentioned.

Thus, IPA 402 may adjust the independent parameter (e.g. deadtime) until the control parameter (e.g. duty-cycle) reaches a minimum value, which may correspond to the least amount of efficiency loss, and may thus maximize efficiency with respect to the independent parameter. In one set of embodiments, there may be more than one adjustable independent parameter, and therefore more than one parameter may be adjusted to optimize efficiency, or to reach the target level of any selected operating characteristic or characteristics. In such cases at least one optimal value of the control parameter may be determined, for example through observation (as mentioned above), and the one or more independent parameters may be adjusted in concert with each other until the optimal value of the control parameter is obtained through CPA 404. Examples of independent parameters that can impact efficiency in power regulators, such as Regulator 100 include deadtime (as previously discussed), gate duration, gate voltage, switching frequency, operating temperature, input voltage, output voltage, output current, and gate drive current. Those skilled in the art will appreciate that other such parameters may also exist depending on specific configurations and system components of a given power regulator.

Adaptive Frequency

Figure 5:
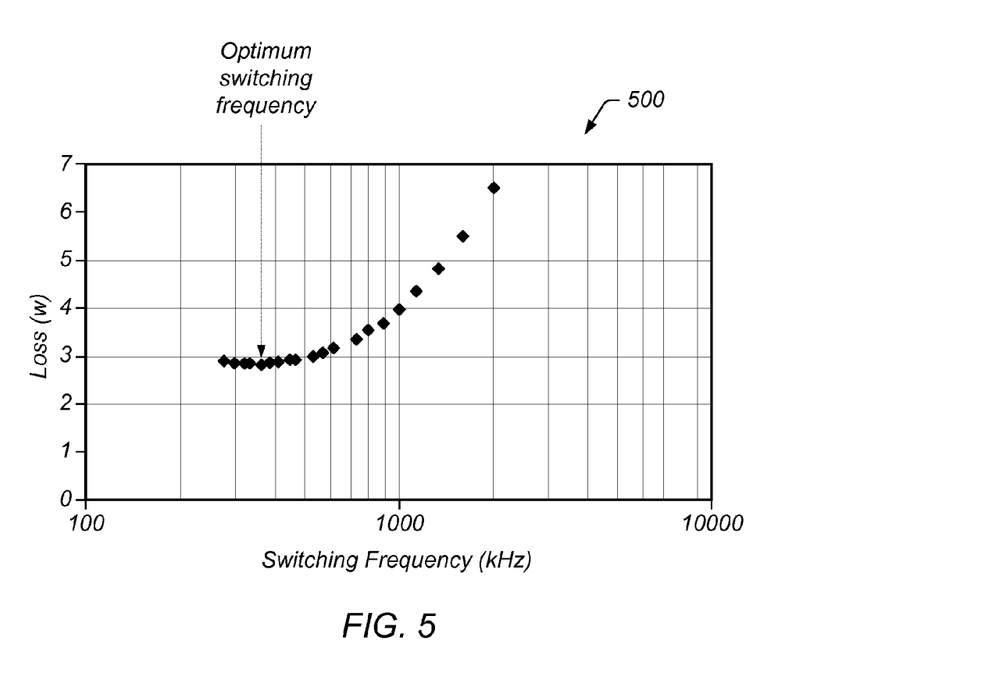
FIG. 5 shows a graph illustrating the relationship between switching frequency and power loss in a PWM feedback control system, according to one embodiment.

Another example of an independent parameter that may affect/impact the efficiency of a power/voltage regulator is the switching frequency. As switching frequency is changed in a pulse modulated power conversion system, the energy losses may increase or decrease. Those skilled in the art will appreciate that switching frequency may also impact efficiency in other systems where periodic signals are used, and that (switching) frequency of given periodic signals may also impact other operating characteristics of the system. As switching frequency is increased, for example, switching losses increase leading to a decrease in efficiency. On the other hand, as frequency is decreased, the RMS (root mean square) current to average current ratio may increase, leading to high conduction losses, and therefore to lower efficiency. There may be, then, an optimal switching frequency at which the system may operate with an optimal efficiency, for a given set of topological, component, parametric, and environmental conditions. FIG. 5 shows one example graph 500 of the relationship between switching frequency (given in KHz, on the horizontal axis) and power loss (given in Watts, one the vertical axis). In the embodiment shown, the value of the switching frequency at which the system appears to be operating at an optimum efficiency—that is with the least amount of loss—is around 360 kHz. However, in alternate embodiments this value may be different, and in some instances more than one such value may exist for a given system.

In one set of embodiments, the switching frequency (e.g. the frequency of the control signals HS 240 and LS 242 for Regulator 100) may be adjusted, based on the relationship between the duty-cycle, switching frequency, and efficiency, according to the principles described above. Accordingly, as the switching frequency, which may be considered a first parameter of the control signals, is adjusted, the resulting value of the duty-cycle, which may be considered a second parameter of the control signals, may be compared to the previous value of the duty-cycle. If the resulting value of the duty-cycle is less than the previous value of the duty-cycle, then the switching frequency may be changed until the value of the duty-cycle begins to increase. It should be noted, that the duty-cycle may vary from adjustments made to the duty-cycle based on the feedback loop (e.g. by CPA 404 as shown in FIG. 4), the duty-cycle being the primary control parameter configured in the feedback loop to maintain regulation of the output $V_{out}$. The switching frequency may then be maintained such that the duty-cycle is minimized. This may be performed in either a continuous or discontinuous mode of operation of the power/voltage regulator. Continuous mode of operation may be designated as a time when current is continuously flowing in the inductor, e.g. in inductor 112 of Regulator 100, while discontinuous mode may refer to a time when the inductor is not conducting any current. In addition, in one set of embodiments, monitoring and comparison may be performed for the duty-cycle of HS signal 240, while the switching frequency may be adjusted for both HS signal 240 and LS signal 242.

Overall, optimal operation, or improved operation (with respect to efficiency) of the system may be maintained by adjusting the switching frequency according to one of various different algorithms. While some of the algorithms, such as the algorithm described above, may result in optimum system efficiency, other algorithms may not automatically optimize efficiency, but may operate to improve the efficiency. In general, an alternative algorithm may be enabled to perform the switching frequency adjustment when a specific condition occurs, which in this case may be designated as the duty-cycle of HS signal 240 reaching a certain value. For example, according to one alternative algorithm, the switching frequency may be adjusted below a nominal default value, which may be a programmed value, when the duty-cycle of HS signal 240 reaches a designated, or specific value, for example when it is below one-half of its maximum value.

When the duty-cycle of HS signal 240 is at zero, which may be considered the lowest possible value of the duty-cycle, the switching frequency may saturate (i.e. it may be adjusted to reach and remain) at a fixed minimum value. When the duty-cycle of HS signal 240 is above the designated value, that is, above half of its maximum value, the switching frequency may saturate at the nominal default, or programmed value.

These boundary conditions may therefore define a saturating linear equation for a scaling factor that may be used to scale the programmed value of the switching frequency. In one set of embodiments, the scaling factor may be defined by a linear equation as a function of the duty-cycle of the HS signal 240, as follows:

$$sf = \frac{\frac{(f_{NOM} - f_{MIN})*2*D}{D_{MAX}} + f_{MIN}}{f_{NOM}}, \quad (1)$$

where 'sf' is the scaling factor, '$f_{NOM}$' is the nominal (programmed) switching frequency, '$f_{MIN}$' is a specified minimum switching frequency, 'D' is the monitored duty-cycle value (which may be adjusted as per CPA stage 404), and '$D_{MAX}$' is the maximum duty-cycle value, which may be defined in terms of the feedback loop control as having a value that approximates the ratio of the output voltage to the input voltage, in continuous mode of operation. It should also be noted that while '$D_{MAX}$' is used here to reference a maximum value of the duty-cycle, the equation may be modified to account for the value of the duty-cycle coming within a specified range of '$D_{MAX}$'. In one set of embodiments, if the value of the scaling factor exceeds 1, the scaling factor may be (re)set to 1.

In one set of embodiments, the minimum switching frequency value may be specified as one of two values. A first value may be specified as 700 KHz, for example, and may be used when the programmed frequency is above or equal to a threshold value, e.g. 750 KHz. A second value may be specified as 200 KHz, for example, and may be used when the programmed frequency is below the threshold value (e.g. 750 KHz). The switching frequency may be adjusted once per main loop iteration, that is, once for each feedback loop adjustment of the duty-cycle of HS signal 240. The switching frequency scaling factor target value may be calculated using the formula (1) shown above, and may be used to adjust the operating switching frequency. In one set of embodiments, for example when a PLL (phase-locked loop) is used for generating the control signal, the value of a PLL divider register may be adjusted toward the scaling factor target value by a specified increment, e.g. a unit value, for each iteration of the main loop (such as the feedback loop of Regulator 100 in FIG. 1). When the duty-cycle of the HS signal 240 settles, the target switching frequency may also settle, and the register value may converge to the scaling factor target value. This behavior may operate to prevent any voltage spikes. Frequency adaptation may be automatically disabled during ramp-up and ramp-down times of the voltage regulator. As previously mentioned, while the alternative algorithm described above may not automatically optimize the efficiency of the system with respect to the switching frequency, it may substantially improve the efficiency of the system.

Overall, in a system in which switching frequency of a control signal may be considered an independent parameter (as described above), the efficiency of the system may be improved by implementing an algorithm that automatically adjusts the switching frequency when a control parameter (which may be the main parameter of a control signal) used for maintaining regulation of the system output reaches a specific value, or is within a specific range of values. The switching frequency may be adjusted based on a scaling factor obtained from calculations performed according to a previously specified equation or set of equations, or it may be repeatedly adjusted based on a monitored value of the control parameter.

It should be noted that one or more power control systems may be configured with POL regulators operating according to the principles described above, with the POL regulators communicating with each other over a common bus, which may be a serial bus, as set forth, for example, in U.S. Publication No. 20040201279 and U.S. patent application Ser. No. 11/198,698, which, were previously indicated as being incorporated by reference as though fully and completely set forth herein.

Figure 6:
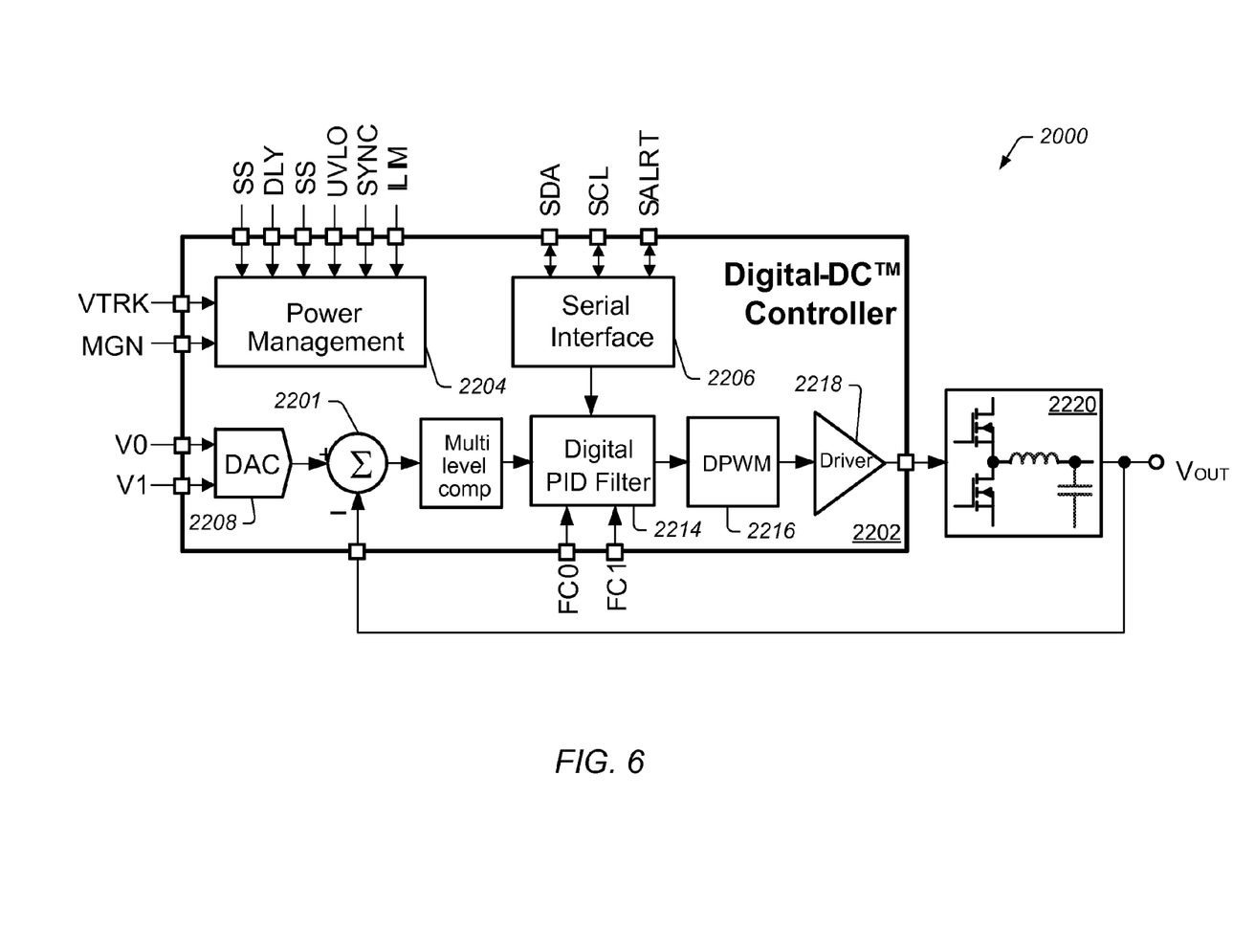
FIG. 6 shows one embodiment of a POL regulator comprising a control unit configured to perform regulation and power management functions.

For example, in one embodiment, as shown in FIG. 6, a point-of-load (POL) regulator 2000 may include a Controller 2202 and an output stage 2220 coupled together. Controller 2202 may be an integrated circuit, and output stage 2220 may comprise output switches, an inductor and a capacitor, to generate an output voltage of POL regulator 2000. Controller 2202 may include a power management unit 2204, a serial interface 2206, a digital-to-analog converter 2208, a pulse-width-modulated (PWM) control signal generating module 2216, driver circuitry 2218, and a digital filter, which may be a digital PID filter 2214. Controller 2202 may be configured to perform various power control functions and regulate the voltage output $V_{out}$ of the POL regulator through a feedback loop to summing element 2201, the feedback loop including digital filter 2214, PWM generator 2216, and driver circuit 2218. In one set of embodiments, Digital PID filter 2214 may be configured with the proper coefficients through serial interface 2206 and/or via pins FC0 and FC1.

Figure 7:
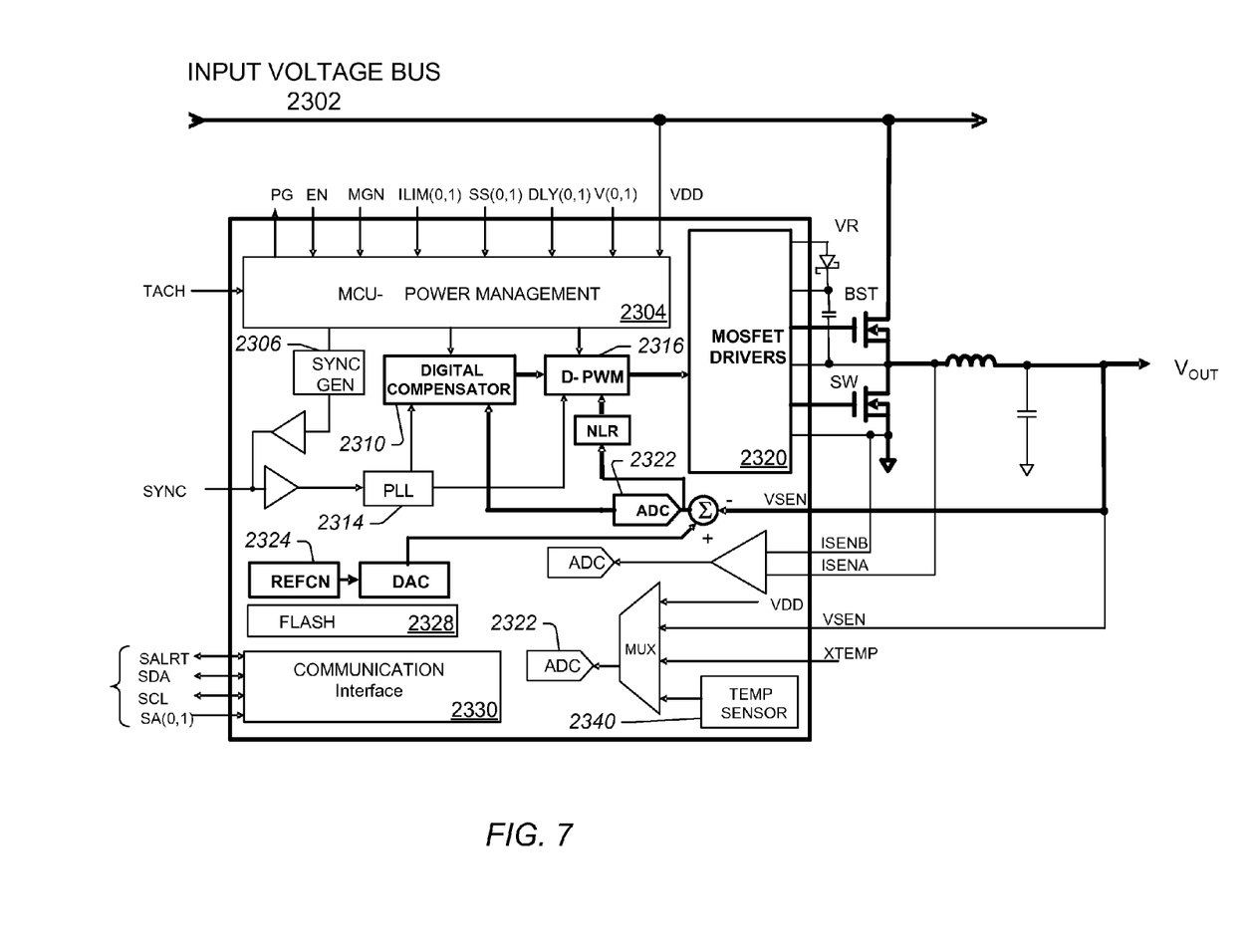
FIG. 7 shows a more detailed embodiment of the control unit shown in FIG. 22.

FIG. 7 shows a more detailed embodiment of the POL regulator 2000 from FIG. 6. As shown in FIG. 7, a Digital-DC-Controller chip may include a microcontroller 2304 configured to execute various algorithms directed at performing various power management functions, a digital compensator 2310, a PWM signal generator 2316, a sync signal generator 2306, a PLL 2314, an ADC 2322, a temperature sensor 2340, a communication interface 2330, a memory storage element 2328, which may be a flash memory, a register 2324, and MOSFET drivers 2320 for driving the high-side FET and low-side FET configured to generate the output $V_{out}$ of the POL regulator from an input voltage received through input voltage bus 2302. As indicated in the embodiment of the POL regulator shown in FIG. 7, a feedback control loop for controlling the output voltage $V_{out}$ and compensating the plant element of the POL regulator may be established via ADC 2322, which may convert $V_{out}$ into a digital value provided to digital compensator 2310, which may effect control of PWM generator 2316, which may itself control MOSFET drivers 2320. MCU 2304 may be configured to execute firmware directed at performing a variety of power management functions. For example, MCU 2304 may be configured to execute a variety of algorithms including adaptive frequency adjustment and/or diode emulation algorithms for optimizing the power efficiency of the POL regulator, load current monitoring, duty-cycle monitoring, etc.

Figure 8:
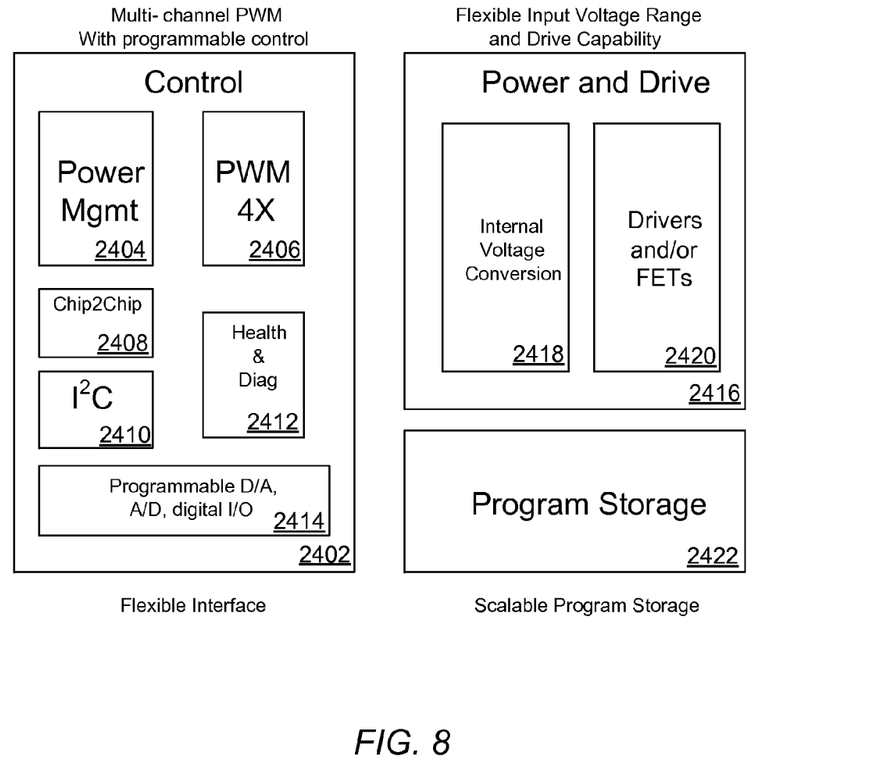
FIG. 8 shows a higher level block structure of one embodiment of a POL regulator divided into a programmable control unit, a power and drive unit, and a program storage unit.

FIG. 8 shows a higher level block structure of one embodiment of a POL regulator, which may be divided according to control and power/driver functionality. In one embodiment, a POL regulator may be partitioned into a control unit 2402 comprising power management functionality 2404, PWM control signal generation 2406, chip-to-chip 2408 and I²C 2410 communication, a diagnostic unit 2412, and programmable digital-to-analog converter, analog-to-digital converter and digital input/output block 2414. Thus, controller 2402 may operate as a pure control unit, with the power and drive block 2416 configured to interface with the output switches, inductor, and capacitor via drivers block 2420, although in some embodiments the switches (FETs) may also be included in block 2420. The power and drive section may further include internal voltage conversion circuitry 2418. Finally, the POL regulator may be configured with an independent storage element 2422, which may be configured to store various algorithms and programs executable by power management unit 2404 to perform various power management functions, including efficiency optimization, load current monitoring, adaptive frequency adjustment, diode emulation, and many others.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for regulating an output of a system, the method comprising:
   adjusting a value of a switching frequency of a control signal;
   detecting that a value of a duty-cycle of the control signal differs from a most recent previous value of the duty-cycle of the control signal;
   adjusting the value of the switching frequency of the control signal in response to said detecting that the value of the duty-cycle of the control signal differs from the most recent previous value of the duty-cycle of the control signal, until the value of the duty-cycle of the control signal is within a specific range of values of the duty-cycle of the control signal; and
   regulating the output of the system using the control signal.

2. The method of claim 1, further comprising adjusting the value of the duty-cycle according to the output of the system.

3. The method of claim 1, wherein said detecting that the value of the duty-cycle of the control signal differs from the most recent previous value of the duty-cycle of the control signal comprises detecting that the value of the duty-cycle of the control signal is less than the most recent previous value of the duty-cycle of the control signal.

4. The method of claim 3, further comprising performing said adjusting the value of the switching frequency of the control signal until said the value of the duty-cycle of the control signal is greater than the most recent previous value of the duty-cycle of the control signal.

5. A method for regulating an output of a system, the method comprising:
   adjusting a value of a switching frequency of a first control signal;
   indicating that a value of a duty-cycle of the first control signal is less than a most recent previous value of the duty-cycle of the first control signal;
   adjusting the value of the switching frequency of the first control signal in response to said indicating; and
   performing said adjusting until the value of the duty-cycle of the first control signal is greater than the most recent previous value of the duty-cycle of the first control signal; and
   regulating the output of the system using the first control signal.

6. The method of claim 5, further comprising adjusting the value of the duty-cycle of the first control signal according to a value of the output of the system.

7. The method of claim 5 further comprising:
adjusting the value of a switching frequency of at least a second control signal in response to said indicating;
performing said adjusting the value of the switching frequency of the at least second control signal until the value of the duty-cycle of the first control signal is greater than the most recent previous value of the duty-cycle of the first control signal; and
regulating the output of the system using the at least second control signal in addition to said regulating the output of the system using the first control signal.

8. The method of claim 5, wherein the first control signal is a pulse-width modulated (PWM) signal.

9. The method of claim 5, wherein said performing said adjusting comprises performing said adjusting to maintain the value of the switching frequency of the first control signal at a value that corresponds to a minimum value of the duty-cycle of the first control signal at which said regulating the output of the system can be performed.

10. The method of claim 9, wherein the minimum value of the duty-cycle of the first control signal at which said regulating the output of the system can be performed corresponds to the system operating at optimum power efficiency.

11. A method for regulating an output of a voltage regulator while improving efficiency of the voltage regulator, the method comprising:
obtaining a value of a duty-cycle of a first control signal;
adjusting, according to the value of the duty-cycle, a value of a switching frequency of one or more of:
the first control signal; and
one or more additional control signals;
wherein said adjusting the value of the switching frequency according to the value of the duty-cycle comprises one or more of:
setting the value of the switching frequency to a corresponding fixed value in response to the value of the duty-cycle reaching one of two boundary values, wherein a first one of the two boundary values is greater than a second one of the two boundary values; and
adjusting the value of the switching frequency according to a scaling factor that is a function of the duty-cycle, in response to the value of the duty-cycle having a value between the two boundary values; and
controlling the output of the voltage regulator using at least the first control signal.

12. The method of claim 11, wherein said setting the value of the switching frequency to a corresponding fixed value comprises setting the value of the switching frequency to a minimum value in response to the value of the duty-cycle reaching the first one of the two boundary values.

13. The method of claim 11, wherein said setting the value of the switching frequency to a corresponding fixed value comprises setting the value of the switching frequency to a programmed value in response to the value of the duty-cycle reaching the second one of the two boundary values.

14. The method of claim 13, further comprising selecting a minimum value according to the programmed value;
wherein said setting the value of the switching frequency to a corresponding fixed value comprises setting the value of the switching frequency to the selected minimum value in response the value of the duty-cycle reaching the first one of the two boundary values.

15. The method of claim 14, wherein said selecting a minimum value according to the programmed value comprises:
selecting a first minimum value when the programmed value is equal or greater to a specific value; and
selecting a second minimum value when the programmed value is below the specific value;
wherein the first minimum value is greater than the second minimum value.

16. The method of claim 11, further comprising adjusting the value of the duty-cycle based on the output voltage of the regulator.

17. The method of claim 16, wherein said adjusting the value of the switching frequency according to the value of the duty-cycle is performed once for each said adjusting the value of the duty-cycle.

18. The method of claim 11, wherein the scaling factor is a function of:
a maximum value of the duty-cycle;
the value of the duty-cycle;
a nominal value of the switching frequency; and
a minimum value of the switching frequency.

19. The method of claim 11;
wherein the first control signal is a pulse-width modulated (PWM) signal.

20. The method of claim 11, further comprising controlling the output of the voltage regulator using the first control signal and one or more of the one or more additional control signals.

21. A point-of-load (POL) regulator comprising:
an output stage configured to generate an output voltage; and
a control stage configured to:
generate a pulse-width modulated (PWM) control signal having a duty-cycle and a switching frequency;
adjust a value of the switching frequency when a value of the duty-cycle differs from a most recent previous value of the duty-cycle, until the value of the duty-cycle is greater than the most recent previous value of the duty-cycle;
adjust the value of the duty-cycle according to the output voltage; and
regulate the output voltage using the PWM control signal.

22. The POL regulator of claim 21, wherein the control stage comprises:
a comparator stage configured to generate a difference signal based on the output voltage and a reference voltage; and
a parameter control stage configured to adjust the value of the duty-cycle based on the difference signal.

23. The POL regulator of claim 17, wherein the control stage further comprises:
an adjustment stage coupled between the parameter control stage and the output stage, and configured to adjust the switching frequency based on the adjusted value of the duty-cycle.

24. A system comprising:
an output stage configured to generate an output of the system; and
a control stage configured to:
obtain a value of a duty-cycle of a first control signal;
set a value of a switching frequency to a corresponding fixed value when the value of the duty-cycle reaches one of two boundary values, wherein a first one of the two boundary values is greater than a second one of the two boundary values;
adjust the value of the switching frequency according to a scaling factor that is a function of the duty-cycle, when the value of the duty-cycle has a value between the two boundary values; and control the output of the voltage regulator using at least
   the first control signal;
wherein the switching frequency is a switching frequency
   of one or more of:
   the first control signal; and
   one or more additional control signals.

\* \* \* \* \*